Oct. 4, 1927.
J. F. HAWORTH
1,644,376
CABLE OR WIRE CLAMP
Filed Jan. 10, 1927
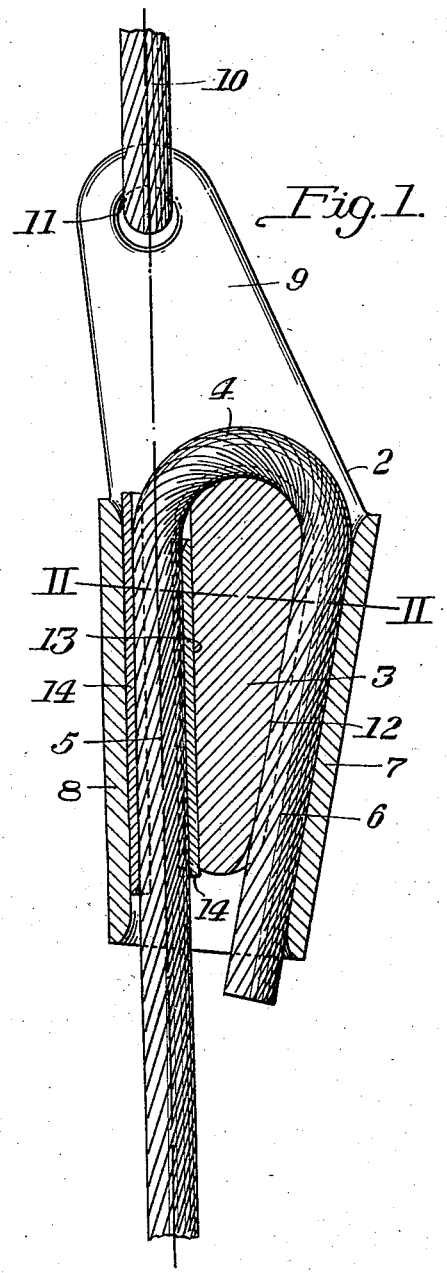
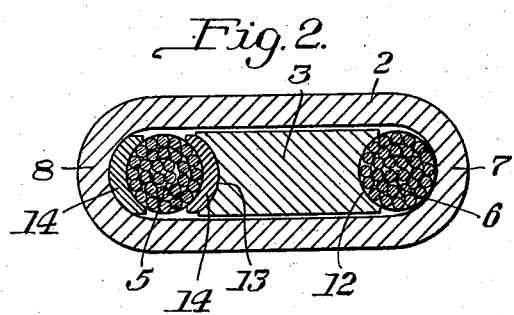
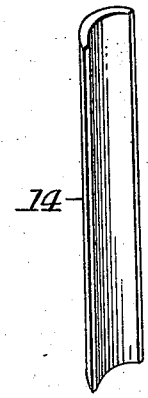
INVENTOR
John Frederic Haworth
by Byrnes, Stebbins & Parmelee,
his attorneys Patented Oct. 4, 1927.

1,644,376

UNITED STATES PATENT OFFICE.

JEHU FREDERIC HAWORTH, OF EDGEWORTH, PENNSYLVANIA.

CABLE OR WIRE CLAMP.

Application filed January 10, 1927. Serial No. 160,126.

The present invention relates to cable or wire clamps and more especially to clamps of the type wherein a portion of a cable or wire is frictionally engaged by a plurality of cooperating gripping members which tend to deform the gripped portion of the cable. In clamps of this type, the gripped portion of the cable is subjected to stresses which unless applied in such manner as to relieve the natural tendency to abrase the outer portions of the cable or wire, result in a material decrease in the working strength thereof when placed under tension.

The invention has for its object, to provide a cable or wire clamp comprising a plurality of gripping members adapted to frictionally engage a portion of a cable or wire having provision for preventing abrasion of the cable or wire while being clamped.

A further object is to provide means whereby the stress exerted by the clamp upon the cable is equalized over a portion of the cable to prevent its being applied substantially at one point whereby the strength of the cable would be considerably lessened.

The invention is shown as embodied in the type connecter in which a loop of wire or cable is passed around a wedge held in a tapered housing so that the tension on one leg of the loop will tend to draw the wedge toward the smaller end of the housing, and thus insure an increasing grip on the wire or cable with an increasing tension. In this type of clamp, there is a natural tendency, as the cable loop is drawn down into the housing, for abrasion of the tensioned leg of the loop between the wedge and the wall of the housing due to the friction between the cable and the gripping parts. I have found that this tendency may be minimized by providing between the cable and the wedge and housing respectively, a facing of material softer than the material of the cable or wire, the facing being adapted to be deformed by the cable or wire as the grip is increased.

In the drawings:

Figure 1 is a longitudinal central section through a cable clamp having my invention applied thereto, showing a cable clamped therein;

Figure 2 is a cross-section taken on the line II—II of Figure 1; and,

Figure 3 is a perspective view of a shim adapted to be inserted between the cable and the clamping member.

The cable clamp comprises a housing indicated generally by reference numeral 2. The housing has a tapered socket in which the wedge 3 is inserted. The cable 4 is passed around the wedge as shown in the form of a loop, the leg 5 of which is a continuation of the tensioned part of the cable. The leg 6 is under relatively little tension since it is the part of the loop toward the free end of the cable. The tapering socket is formed between the converging side walls 7 and 8.

As will be readily apparent, a pull on the tensioned part 5 of the cable will tend to draw the wedge 3 toward the smaller end of the tapered socket and will increase the grip on the cable between the wedge and the sides of the socket. The upper part of the housing has an extension 9 on which is provided suitable means for engaging an attaching device such as another cable 10. Such means may conveniently be in the form of an eye 11. The bearing point of the eye is directly in the center line of the tensioned part 5 of the cable, so that the pull exerted is in direct line of the cable, and the cable is not subjected to any weakening kinks or bends where it emerges from the clamp.

The wedge 3 has tapered cable-engaging edges 12 and 13. These edges are preferably channeled to permit them to partially encircle a cable as shown in Figure 2.

Between the tensioned leg 5 of the cable loop and the wedge and housing respectively, I provide shims 14 of material softer than the material of the cable. These shims are preferably arcuate in cross-section so as to fit between the cable and the channeled portions of the housing and wedge respectively. As tension is gradually applied to the cable by drawing the loop toward the smaller end of the socket, the cable will cause a slight deformation in each of the shims by reason of the fact that they are relatively soft and pliable. The inner surface of each shim, that is, the surface next the cable, will thus be made to conform with the exterior surface of the cable so that pressure is brought to bear substantially at every point longitudinally of the clamped portion of the cable. Any tendency of the housing and wedge to cause abrasion of the cable as it moves relatively thereto, is thus removed, as any relative movement will be between the cable and the shims and will merely cause portions of the shims to be slightly displaced.

I may, if desired, form the cable-contacting members as integral facings on the housing and wedge respectively, rather than providing separate shims. I may also coat the portion of the cable to be clamped with a suitable material before inserting the cable loop into the housing. As the housing and wedge are usually formed of a hard metal such as iron or steel, the softer facing portion or shim may conveniently be comprised of a softer metal or alloy such as copper, zinc, lead, etc. The coating which might be applied to the cable might conveniently comprise white lead or a suitable alloy of lead and zinc or copper. The provision of a separate shim has certain advantages over an integral coating. As the load is drawn down into the housing, the shim may be caused to slide relatively to the housing, thus tending to reduce distortion thereof.

While I have shown the facing portions or shims as applied on both sides of the clamped portion of the cable, it is understood that such provision might effectively be made on one side only, such as between the cable and the housing, for the reason that by far the greater relative movement occurs on that side of the cable.

While I have specifically illustrated and described the preferred embodiment of my invention, it is to be understood that the invention is not limited to its illustrated embodiment, but may be otherwise embodied within the scope of the following claims.

I claim:

1. A clamp for cables or wires, comprising a plurality of gripping members adapted to frictionally engage a portion of a cable or wire, and a facing of material softer than the material of the cable or wire between the cable or wire and at least one of the gripping members, the facing being adapted to be deformed by the cable or wire to prevent abrasion thereof while being clamped.

2. A clamp for cables or wires comprising a plurality of gripping members adapted to frictionally engage a portion of a cable or wire, at least one of the gripping members being provided with a facing of material softer than the material of the cable or wire, the facing lying next the cable or wire and adapted to be deformed thereby to prevent abrasion thereof while being clamped.

3. A clamp for cables or wires comprising a plurality of gripping members adapted to frictionally engage a portion of a cable or wire, and a shim of material softer than the material of the cable or wire interposed between the cable or wire and at least one of the gripping members, the shim being adapted to be deformed by the cable or wire to prevent abrasion thereof while being clamped.

4. A clamp for cables or wires, comprising a housing having a tapered socket for receiving a loop of a cable or wire, a wedge in the socket and within the loop for frictionally clamping the cable or wire against the socket, and a shim of material softer than the material of the cable or wire interposed between the tensioned leg of the loop and the socket, to prevent abrasion of the cable or wire while the loop is being clamped between the wedge and the socket.

5. A clamp for cables or wires, comprising a housing having a tapered socket for relieving a loop of a cable or wire, a wedge in the socket and within the loop for frictionally clamping the cable or wire against the socket, and a pair of shims of material softer than the material of the cable or wire interposed between the tensioned leg of the loop and the wedge and socket respectively to prevent abrasion of the cable or wire while the loop is being clamped between the wedge and the socket.

6. A clamp for cables or wires, comprising a plurality of gripping members adapted to frictionally engage a portion of a cable or wire, and a facing of material softer than the material of the gripping members and softer than the material of the cable or wire between the cable or wire and at least one of the gripping members, the facing being adapted to be deformed by the cable or wire to prevent abrasion thereof while being clamped.

In testimony whereof I have hereunto set my hand.

JEHU FREDERIC HAWORTH.